Patented Apr. 27, 1926.

1,582,566

UNITED STATES PATENT OFFICE.

JOHANN KARL WIRTH, OF BERLIN-CHARLOTTENBURG, GERMANY.

METHOD OF COATING METAL AND OTHER SURFACES.

No Drawing. Application filed October 26, 1921. Serial No. 510,641.

*To all whom it may concern:*

Be it known that I, JOHANN KARL WIRTH, a citizen of the German Empire, residing at Berlin-Charlottenburg, in the State of Prussia, Germany, have invented certain new and useful Improvements in a Method of Coating Metal and Other Surfaces, of which the following is a specification.

Many attempts have been made to coat iron or the like with bakelite and similar condensation products in order to render them capable of resisting acids or other chemical influences. In the processes hitherto used either the condensation product not mixed with filling materials was applied directly to the surface to be coated, or a liquid condensation product was first mixed with asbestos or the like and then applied by a trowel or the like. The addition of asbestos, as is well known, increases the capacity of resistance of the protecting layer afforded against mechanical influence and wear.

It has, however, been found in practice that by adding the asbestos to the liquid condensation product an important disadvantage arose, namely the formation of blisters in hardening the protecting layer by heating. Even when great care was taken and the materials slowly hardened it was not always possible to obtain large surfaces completely free from blisters. These blisters are not small blisters but swellings of several centimetres wide, and consequently the protecting layer loosens from its support and often breaks up.

It has been found that the possibility exists of utilizing the advantages of a bakelite asbestos mixture without the formation of these blisters. In accordance with the invention this result is obtained as follows:—

In the first place the surface to be coated is, if necessary, carefully freed from rust or impurities, and also if desired roughened somewhat. With the aid of a paintbrush or spraying device the condensation product is then applied in liquid form or as a solution in a thin layer. The layer of resin is allowed to become semi-fluid, whereupon asbestos paper, asbestos board or the like, is caused to adhere to the surface, care being taken that the asbestos paper lies flat and that the condensation product does not saturate the paper layer. The condensation product is now thoroughly hardened by heating, with or without the use of pressure, and, as a consequence, blisters are not formed. After hardening has taken place the condensation product is applied to the asbestos surface, which has remained soft, in a liquid or dissolved form of such limpidity that the fluid may penetrate the pores of the fibre. If quite thin asbestos paper is employed—for example, paper of 100 grammes per square metre—sufficient penetration has taken place when the asbestos layer becomes translucent. Now the second layer may be hardened, which may be carried out by the known hardening process without danger. The coating obtained adheres extremely well and offers great resistance to chemical and mechanical influences.

A suitable number of such layers may be applied and when necessary asbestos plates several millimetres thick may be employed. The thorough penetration of the artificial resin solution may be facilitated by the employment of a vacuum and pressure. The protecting layer described may be applied both to metals, as also to other suitable materials, such as, for example, cardboard, which is impregnated with artificial resin and hardened, or to refractory natural or artificial stones, as also to wire fabrics, &c. This process has been found suitable for flat or slightly curved articles. Where the surface to be protected is very uneven it has the disadvantage that the asbestos layer does not adhere closely to the foundation. Air spaces remain between the foundation and the protecting layer, which unfavourably affect the adhesion and durability of the coating. If tubes, armature parts, or the like are to be coated with an inner uniform protecting layer the above described method often fails. In such circumstances the process is carried out as follows:—

The surface to be protected is first moistened in the manner described with the liquid condensation product. The brittle asbestos paper, asbestos board, or the like, to be applied, is then thoroughly saturated with water, rendering it plastic and pliable. In this condition, however, it cannot be applied to the surface to be protected as the phenol-formaldehyde condensation products in question cannot be thinned or mixed with water. The layer of fabric therefore must either be considerably compressed or dried in air, care being taken that it remains sufficiently moist and flexible. In this condition the moist asbestos fabric is coated on the side to be applied with the condensation product, In this state the condensation product has been found to adhere to the fabric. The coated fabric is placed on the coated surface of the foundation, pressed thereon or rolled, so that satisfactory adhesive is obtained. Then the moist layer of fabric is dried at a low temperature, preferably at air temperature by the use of an artificial draught. Then the layer of adhesive is hardened and a further layer of the liquid condensation product as above described is applied.

It is possible in this maner to coat narrow iron tubes of some metres in length internally with a unifrom strong bakelite asbestos layer.

Often it is desirable, in lieu of using water, to utilize other liquids for moistening the fibrous layer. Many asbestos products, after being moistened with water, particularly if they consist of very short fibres, are easily torn and for this reason are unsuitable for the treatment described. In such instances preferably moistening solutions are used which contain binding agents, such as thin aqueous water-glass solutions or alcoholic artificial resin solutions and the like. Still other effects can be obtained by suitable selection of the moistening means. Thus, for example, chemicals may be deposited between the pores of the fabric layer which, after evaporation of the solvent and impregnation with the phenol-formaldehyde condensation product, exert an accelerating effect on the hardening process. Different acids and other compounds may also be used for the said purpose.

It is particularly to be noted that the moistening means may be evaported at low temperature before the condensation product forming the adhesive layer throws off the steam or gaseous reaction products. A temperature of 50° to 60° Celsius must not be exceeded in the drying operation. Only when the preliminary drying has proceeded so far that the pores of the asbestos fabric allow again the evaporation of the volatile reaction product of the adhesive layer, can hardening be effected, whereupon the further treatment as described is carried out.

In many cases it is desirable to use the fibrous layer not in the form of complete fabrics, plates, or the like, but as loose fibres applied to the surface to be protected. The loose fibres may be applied in pasty condition to the surface provided with adhesive layer in a suitable manner, for example by rolling, by centrifugalizing or otherwise. As a means of making the fibres pasty, water or other easily drying liquids or solutions which do not completely close the pores may be used. After the fibrous layer is died and the adhesive layer hardened, further treatment is carried out in the same way as with complete plates or fabrics.

This process offers in such cases considerable advantages in that it may be used for covering perforated metal or other surfaces, as in the production of coatings or coverings for metal fabric foundations, perforated sheets, &c.; in the production of coatings for wire fabrics, the loose fibres may be applied direct to the foundation to be protected suitably in moist condition without the previous application of an adhesive layer. The application is effected suitably by pressure or by rolling, the loose fibre layer adhering to the fabric-like foundation and the openings therein being completely filled. If the fibre after treatment is impregnated with the condensation product a strong covering layer is produced.

In lieu of asbestos fibres there may be used in certain cases also other fibrous materials, such as, for example, paper fibres or cellulose fibres or the like, which may be used alone or mixed with asbestos fibres in the form of felt fabric or plates, or also as loose fibres.

Having now particularly described and ascertained the nature of my said invention and in what manner the same is to be performed, I declare that what I claim is:—

1. A method for producing a strong coating on solid surfaces by means of condensation products of phenol and formaldehyde, and of fibrous materials, comprising, applying a coating layer of the condensation product to the surface to be protected, then applying a layer of fiber to said coating layer, then completely hardening the coating layer, then thoroughly impregnating the said layer of fiber by means of the condensation product after the lowest layer has been completely hardened, and after the impregnation, completely hardening the said impregnating material.

2. A method for producing a strong coating on impervious solid surfaces, by means of condensation products of phenol and formaldehyde, and of fibrous materials, comprising, applying a coating layer of the condensation product to the surface to be protected, applying, by pressure, a layer of fiber to said coating layer, then hardening the coating layer, then completely impregnating the said layer of fiber by means of the condensation product after the lowest layer has been completely hardened, and after the impregnation, completely hardening the said impregnating material.

3. A method for producing a strong coating on solid surfaces by means of condensation products of phenol and formaldehyde, and of fibrous materials, comprising first applying a coating layer of the condensation product to the surface to be protected, then spreading a layer of loose fibres on said coating layer, then completely hardening the coating layer, then thoroughly impregnating the said layer of fibre by means of the condensation product, and finally completely hardening the said impregnating material.

4. A method for producing a strong coating on solid surfaces by means of condensation products of phenol and formaldehyde, and of fibrous materials, comprising first applying a coating layer of the condensation product to the surface to be protected, applying a layer of moistened fibrous material to said coating layer, then completely drying the fibrous layer at low temperature and hardening the coating layer, then thoroughly impregnating the said layer of fibre by means of the condensation product and finally completely hardening the said impregnating material.

5. A method for producing a strong coating on solid surfaces by means of condensation products of phenol and formaldehyde, and of fibrous materials, comprising first applying a coating layer of the condensation product to the surface to be protected, then moistening the fibrous material to be applied on said coating layer with easily drying liquids containing media accelerating condensation, then applying said fibrous layer to said coating layer, then completely drying the fibrous layer at low temperature and hardening the coating layer, then thoroughly impregnating the said layer of fibre by means of the condensation product and finally completely hardening the said impregnating material.

6. A method for producing a strong coating on solid surfaces by means of condensation products of phenol and formaldehyde, and of fibrous materials, comprising first applying a coating layer of the condensation product to the surface to be protected, then moistening the fibrous material to be applied on said coating layer with easily drying liquids containing binding agents, then applying said fibrous layer to said coating layer, then completely drying the fibrous layer at low temperature and hardening the coating layer, then thoroughly impregnating the said layer of fibre by means of the condensation product and finally completely hardening the said impregnating material.

7. A method for producing a strong coating on metal surfaces by means of condensation products of phenol and formaldehyde, and of fibrous materials, comprising first applying a coating layer of the condensation product to the surface to be protected, then applying, by pressure a layer of fibre to said coating layer, then completely hardening the coating layer, then thoroughly impregnating the said layer of fibre by means of the condensation product, and finally completely hardening the said impregnating material.

In testimony whereof I affix my signature.

JOHANN KARL WIRTH.